(12) United States Patent
Melander et al.

(10) Patent No.: US 7,509,572 B1
(45) Date of Patent: Mar. 24, 2009

(54) AUTOMATIC GENERATION OF DOCUMENT SUMMARIES THROUGH USE OF STRUCTURED TEXT

(75) Inventors: Nicole M. Melander, Rockville, MD (US); Ophir Frieder, Chicago, IL (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 09/356,105

(22) Filed: Jul. 16, 1999

(51) Int. Cl.
*G06F 17/00* (2006.01)
*G06F 17/27* (2006.01)

(52) U.S. Cl. .................. 715/234; 715/254; 715/273; 704/9; 707/100

(58) Field of Classification Search .................. 707/513, 707/514, 531, 3, 1, 5, 100, 102, 200; 715/513, 715/514, 531, 200, 201, 234, 273, 209, 231, 715/254–256, 265, 274, 760, 841; 709/218, 709/231; 704/1, 4, 7–10
See application file for complete search history.

(56) References Cited

U.S. PATENT DOCUMENTS

| | | | | |
|---|---|---|---|---|
| 5,050,071 A | * | 9/1991 | Harris et al. .................... 707/1 |
| 5,146,406 A | * | 9/1992 | Jensen ........................... 704/9 |
| 5,317,507 A | * | 5/1994 | Gallant ....................... 707/532 |
| 5,642,520 A | * | 6/1997 | Takeshita et al. ............... 704/3 |
| 5,708,825 A | * | 1/1998 | Sotomayor ............... 707/501.1 |
| 5,826,256 A | * | 10/1998 | Devanbu ........................ 707/4 |
| 5,963,940 A | * | 10/1999 | Liddy et al. .................... 707/5 |
| 5,966,686 A | * | 10/1999 | Heidorn et al. ................. 704/9 |
| 6,026,388 A | * | 2/2000 | Liddy et al. .................... 704/9 |
| 6,055,544 A | * | 4/2000 | DeRose et al. ........... 707/104.1 |
| 6,076,088 A | * | 6/2000 | Paik et al. ...................... 707/5 |
| 6,098,062 A | * | 8/2000 | Janssen ......................... 706/59 |
| 6,108,620 A | * | 8/2000 | Richardson et al. ............ 704/9 |

(Continued)

FOREIGN PATENT DOCUMENTS

EP      0933712 A2 * 4/1999

(Continued)

OTHER PUBLICATIONS

Khare et al., "XML: A Door to Automated Web Applications", IEEE Internet Computing, Aug. 1997, pp. 78-87.*

(Continued)

*Primary Examiner*—Doug Hutton
*Assistant Examiner*—Maikhanh Nguyen
(74) *Attorney, Agent, or Firm*—Townsend and Townsend and Crew LLP

(57) ABSTRACT

A summarization system generates summaries from documents. Text structure tags, in conformance with the Text Encoding Initiative (TEI), are inserted into the documents to generate encoded documents. The text structure tags, when associated with portions of the document, identify text types. A text type, such as an argumentative text type, provides meta-information about the associated portion of text. The documents are also encoded, via document type declaration ("DTD") in the eXtensible mark-up language ("XML"), to generate a tree structure that depicts the text types and hierarchical relationships among the text types in the tree structure. The summarization system generates a summary of the documents by extracting portions of the document, associated with the text type tags, using the tree structure in accordance with user input. The summarization system may be used to generate summaries from multiple documents.

9 Claims, 11 Drawing Sheets

U.S. PATENT DOCUMENTS

| | | | | |
|---|---|---|---|---|
| 6,112,168 | A * | 8/2000 | Corston et al. | 704/9 |
| 6,154,213 | A * | 11/2000 | Rennison et al. | 715/854 |
| 6,167,409 | A * | 12/2000 | DeRose et al. | 707/10 |
| 6,182,029 | B1 * | 1/2001 | Friedman | 704/9 |
| 6,185,592 | B1 * | 2/2001 | Boguraev et al. | 715/256 |
| 6,205,456 | B1 * | 3/2001 | Nakao | 707/3 |
| 6,240,507 | B1 * | 5/2001 | Derrick et al. | 707/1 |
| 6,289,304 | B1 * | 9/2001 | Grefenstette | 704/9 |
| 6,295,529 | B1 * | 9/2001 | Corston-Oliver et al. | 707/3 |
| 6,317,708 | B1 * | 11/2001 | Witbrock et al. | 704/9 |
| 6,359,633 | B1 * | 3/2002 | Balasubramaniam et al. | 345/738 |
| 6,493,663 | B1 * | 12/2002 | Ueda | |
| 6,546,406 | B1 | 4/2003 | DeRose et al. | |
| 6,963,830 | B1 * | 11/2005 | Nakao | 704/1 |
| 6,993,527 | B1 * | 1/2006 | Raman et al. | 707/100 |

FOREIGN PATENT DOCUMENTS

| | | | |
|---|---|---|---|
| WO | WO-00 14651 A | * | 3/2000 |
| WO | WO-01 11492 A | * | 2/2001 |

OTHER PUBLICATIONS

Wang et al., "Structured Hypertext with Domain Semantics", ACM Transactions on Information Systems, vol. 16, No. 4, Oct. 1998, pp. 372-412.*

Nancy Ide, "Encoding standards for large text resources: The Text Encoding Initiative," Proceedings of the 15th conference on Computational linguistics, vol. 1, ACM, Aug. 1994, pp. 574-578.*

R. Cohen, "Coherent analysis of argument discourse", IEEE, 1988, pp. 468-469.*

R. Cohen, "Analyzing the Structure of Argumentative Discourse", Computational Linguistics, vol. 13, No. 1-2, 1987.*

I. Mani et al., "Machine Learning of Generic and User-Focused Summarization", Nov. 1998, pp. 1-6.*

L. Polanyi "A Formal Model of the Structure of Discourse", Journal of Pragmatics 12, 1998, pp. 601-638.*

Ehlich et al. "Connectedness in Sentence, Discourse and Text", Dept. of Language and Literature, Apr. 1983, pp. 1-41.*

Corston-Oliver, S.H., "Identifying the Linguistic Correlates of Rhetorical Relations," pp. 8-14 from *Discourse Relations and Disclosure Markers: Proceedings of the Workshop, Aug. 15, 1998, Universite de Montreal, Montreal, Quebec, Canada*, Wanner & Hovy, Eds.

"Extensible Markup Language (XML), World Wide Web Consortium Dec. 8, 1997," by W3C.

Govier, T., *A Practical Study of Argument, 3rd Edition*, Chapter 1, pp. 2-3, "What is an Argument? (And What Is Not?)," published by Wadsworth, Inc. (1992).

Marcu, D., "Discourse trees are good indicators of importance in text," 14 pages from *Advances in Automatic Text Segmentation*, Mari and Maybury, Eds., MIT Press. 1999 MK.

Moens, S.T.M., "Sentence extraction and rhetorical classification for flexible abstracts," pp. 1-18 downloaded from internet Feb. 18, 1999.

Strzalkowski et al., "A Robust Practical Text Summarization," pp. 26-33, GE Corporate Research and Development, supported by Defense Advanced Research Projects Agency under contract 97-F157200-000 from Office of Research and Development. 1998 MK.

* cited by examiner

AUTOMATIC GENERATION OF DOCUMENT SUMMARIES THROUGH USE OF STRUCTURED TEXT

BACKGROUND OF THE INVENTION

1. Field of the Invention

The present invention is directed toward the field of text summarization, and more particularly toward generating summaries of documents from structured text in those documents.

2. Art Background

In general, text summarization is the ability to provide an overview of synopsis of information from one or more sources. For purposes of nomenclature, a document is broadly defined herein as a source of information. A document may consist of a periodical, an article, a book, etc. One goal of systems that manage documents is to automate the generation of summaries for one or more documents.

Intelligent text summarization is among the largest problems facing the information management community. In the prior art, summarization of information typically deals almost exclusively with corpora from the news domain to provide summaries of a single news story. However, these techniques do not attempt to compare and contrast the news reported by more than one bureau. New summarization techniques are needed because the overwhelming amount of textual information on the Internet threatens to render the medium useless. The average request for a "match" on a single word using a search engine results in over 2,000 "hits". Most of these "hits" are unrelated, outdated, or irrelevant to the match query. This problem of query precision is exacerbated when the user attempts to combine related textual information from multiple documents. For example, a user of an information management system may desire to compare analyst statements from multiple documents relating to a potential stock investment. Currently, the solution for processing this query results in a sequential scan of each of the analysts statements and a subsequent manual compilation of the opinions identified. As another example, if the user wishes to monitor the change in issue position statements for a political candidate, then the user sequentially scans the full text of this temporal textual information, so as to render a decision regarding the changing position. Accordingly, it is desirable to develop a system that permits a user to compare summarized information from multiple document sources.

Text structure contributes to the identification of classes of documents (e.g., business letters vs. journal articles vs. user manuals), parts of documents (e.g., the sports page vs. the classified advertisements in the newspapers) and the types of information contained in a document (e.g., subsidiary information in footnotes vs. primary information in titles, paragraph breaks at topic breaks). Text structure clearly plays a role in text comprehension. The use of text structure is largely ignored in fields of computational linguistics and information retrieval. In the prior art, no information retrieval system or information extraction system uses more than a cursory use of text structure. There is also no attempt to utilize the structure of text to add intelligence to the summarization process.

In general, text structure involves identifying, with a standardized language, various attributes of a document. For example, HTML documents, pervasive on the Internet, provide some information about text structure including headings and paragraph breaks. However, the minimal amount of structural information provided in HTML documents does not provide the underlying structure for use to generate documents summaries. The eXtensible mark-up language ("XML") embeds structural information into a textual document. It is desirable to develop a text summarization system that utilizes structural information to generate summaries of documents. As is described fully below, the present invention utilizes text structure (i.e., structural information embedded into a document), to create hierarchical relationships using text type understanding so as to provide enhanced text summarization of documents.

SUMMARY OF THE INVENTION

A summarization system generates summaries from documents. Text structure tags are inserted into the documents to generate encoded documents. In one embodiment, the text structure tags are in conformance with tags of the Text Encoding Initiative (TEI). The text structure tags, when associated with portions of the document, identify text types. A text type provides meta-information about the associated portion of text. In one embodiment, the text types comprise argumentative text types.

The documents are also encoded to generate a tree structure consisting of a plurality of nodes. The nodes correspond with the text types and relationships among the nodes in the tree structure reflect hierarchical relationships among the text types. In one embodiment, the tree structures are encoded in the documents through use of the document type declaration ("DTD") in the eXtensible mark-up language ("XML").

The summarization system generates a summary of the documents by identifying nodes from the tree structure to select items for the summary in accordance with user input. The portions of documents that correspond to the nodes selected are then extracted from the document based on the text type tags. The summarization system may be used to generate summaries from multiple documents. For this embodiment, tree structures for multiple documents are combined. Nodes of the combined tree structure are selected to extract portions of text from the multiple documents to form the summary.

DETAILED DESCRIPTION

Summarization System Overview

Figure 1:
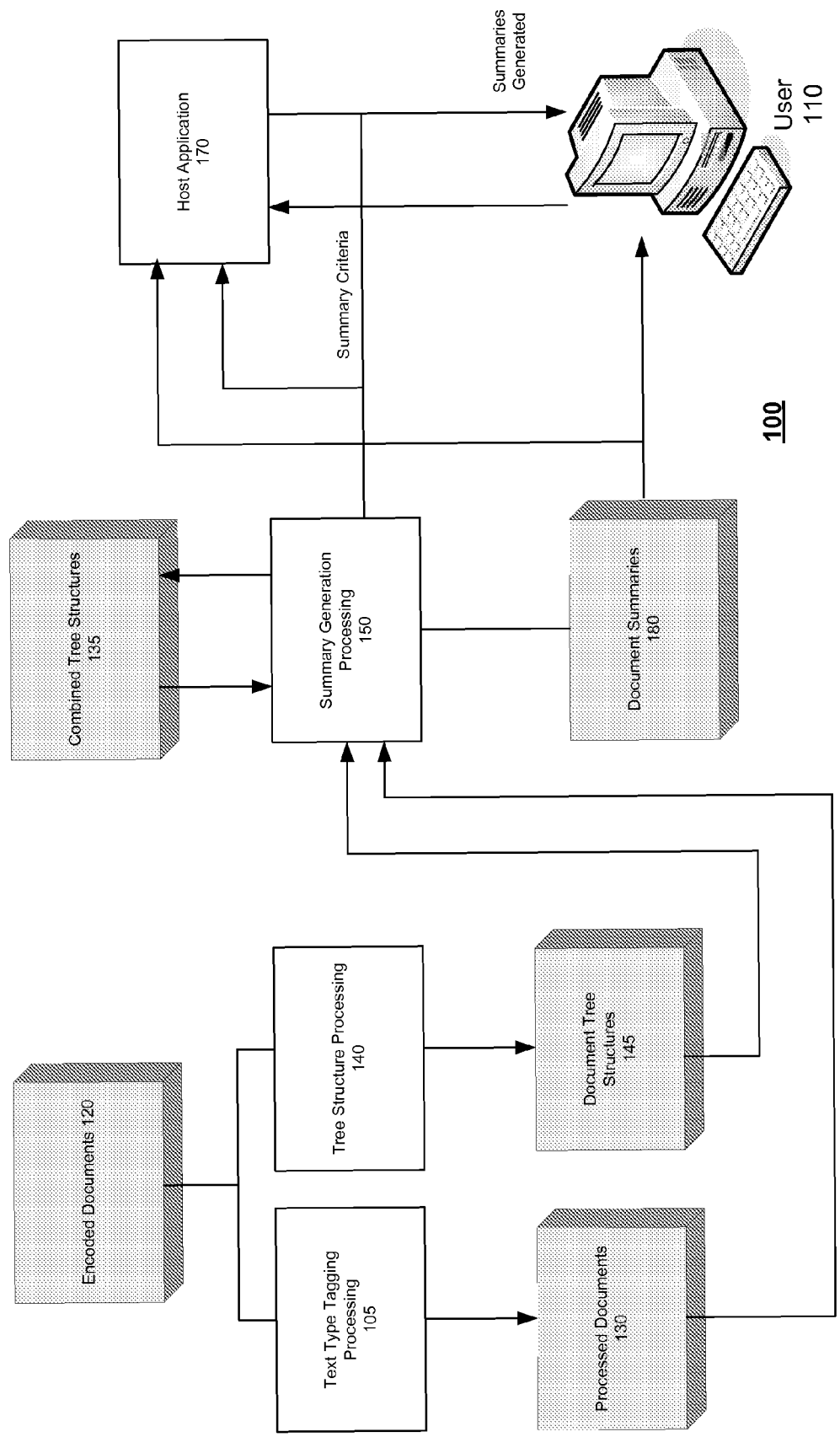
FIG. 1 is a block diagram illustrating one embodiment for the summarization system of the present invention.

FIG. 1 is a block diagram illustrating one embodiment for the summarization system of the present invention. In general, the summarization system 100 processes encoded documents 120, and generates, as an output, summaries 180 of the encoded documents 120. As shown in FIG. 1, the user, through a computer 110, views the summaries. As described more fully below, in one embodiment, the host application 170 operates in conjunction with the summarization system to interface the summarization system to web browsers, information retrieval and information extraction systems.

In operation, the encoded documents 120, which represents the corpus of information used by the summarization system 100, is processed by text type processing 105 and tree structure processing 140. In one embodiment, these processing modules are implemented in an eXtensible mark-up language ("XML") processor module, that decodes the information in accordance with an XML encoding scheme. The processed documents 130 represent the documents for which the XML processor identifies the content through decoding of the text type tags. In one embodiment, the text type tags are encoded in accordance with the text encoding initiative ("TEI"). The document tree structure 145, generated by the tree structure processing 140, stores hierarchical relationships regarding argumentative text types coded through the document type declarations of the XML encoded documents 120.

The summarization system 100 includes summary generation processing 150 that generates the summaries using the processed documents 130, the document tree structure 145, and the combined tree structures 135. The combined tree structures 135 combines tree structures from multiple documents that have a common item. For example, the combined tree structures 135 may combine the individual tree structures from three book review articles on the same book. The summary generation processing 150 automatically builds summaries based on summary criteria from the user 110 or from the host application 170.

Argumentative Discourse Structure Analysis

In general, "argument" is a set of claims that a person sets forward in an attempt to show that some further claim is rationally acceptable. Typically, people present arguments to persuade others to accept claims. The evidence or reason put forth in defense of a claim are called premises of an argument. An argument may have several premises or it may have only one. The claim, defended in the argument, is referred to as its conclusion. An argument, then, is composed of one or more premises and a conclusion. (See Govier, Trudy, "A Practical Study of Argument", Belmont, Calif., pp. 2-3, 1992).

A discourse model has been developed through the study of corpora in the domain of physics. In a first phase of the investigation, information content and macro-structure organization have been drawn from physics abstracts published in technical journals. In a second phase, corpus has been collected via empirical study consisting of a summarization task carried out by domain-expert writers. Both experiments have provided similar data concerning informational content and macro-organization. The analysis of the naturally produced summaries suggests that different summaries convey content at different levels of representability, by means of diverse discourse structures. In one embodiment, the present invention utilizes this approach to create argumentative summaries. In one embodiment, the text type tagging processing 105 (FIG. 1) is used to analyze incoming document, via part-of-speech tagging. In one embodiment, each part-of-speech is mapped into the text type outlined in the paper "Analyzing the Structure of Argumentative Discourse", Author: R. Cohen, Computational Linguistics, 13:1-2, pp. 11-24, (1987).

In one embodiment, all incoming encoded documents 120 (FIG. 1) are divided into the object types as listed above.

<argument>
<premise>
<evidence>
<observation>
<background>
<conclusion>

Also, the incoming encoded documents 120 are parsed into the actions listed below.

<elaborates>
<supports>
<causes>
<explains>
<conflicts>
<negates>

A definition for the object types and actions follows.

Argument: reason or reasons offered in proof, to induce belief, or convince the mind; reasoning expressed in words; as, an argument above, concerning, or regarding a proposition, for or in favor of it, or against it.

Premise: to set forth beforehand, or as introductory to the main subject; to offer previously, as something to explain or aid in understanding what follows; especially, to lay down premises or first propositions, on which rest the subsequent reasoning.

Evidence: reveal; (a telling sign); an indication that makes something evident.

Observation: the act or faculty of observing or taking notice; the act of seeing, or of fixing the mind above, anything.

Background: ground in the rear or behind, or in the distance as opposed to the foreground, or the ground in front.

Conclusion: the last part of anything; close; termination; end. Final decision; determination; result.

The action types, as defined in Websters New World Dictionary are provided below.

Elaborates: to perfect with painstaking; to improve or refine with labor in study or by success of operation; as, to elaborate a painting or a literary work.

Supports: to bear by being under; to keep from falling; to uphold; to sustain, in a literal or physical sense; to prop up; to bear the weight of, as, a pillar supports a structure; an abutment supports an arch; the trunk of a tree supports the branches.

Causes: that which produces or affects a result; that from which anything proceeds, as without which it would not exist.

Explains: to make plain, to manifest, or intelligible; to clear of obscurity; to expound; to enfold and illustrate the meaning of; as, to explain a chapter of the bible.

Conflicts: to be in opposition; to be contrary.

Negate: prove negative; show to be false.

Figure 2:
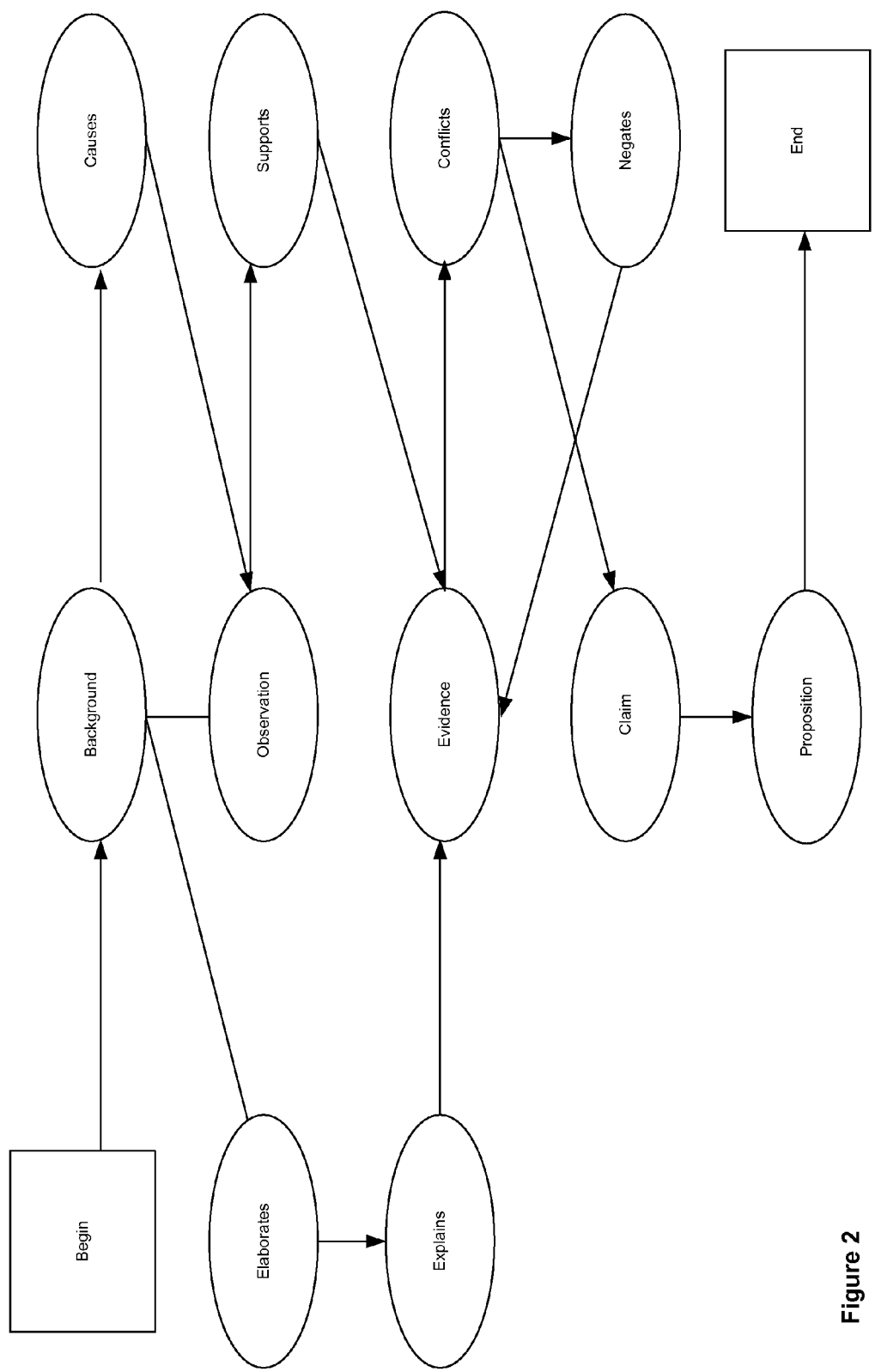
FIG. 2 diagrammatically illustrates the generalized structure for an argument.

In one embodiment, the generalized structure of an argument is coded into the definition of the document (step 140). FIG. 2 diagrammatically illustrates the generalized structure for an argument. The description herein describes the use of the structure of FIG. 2 in three general steps. First, the encoding of the XML tags to represent an argument is described. Second, the conversion of the these argument-specific tags to generalized TEI tags is described. Finally, the encoding of the relationships represented by the arrows in FIG. 2 are described.

Once the objects and actions are identified in step 105, the resulting text-type definition specific to this type of discourse is used in step 140 to create a conceptual form of the incoming documents (document tree structures 145, FIG. 1). The conceptual form is a "tree" formed from a series of tags (such as "proposition") and relationships (such as "evidence"). The tree structure for each argumentative text is built pre-order or post-order, depending on the discourse model selected by the author of the text. The primary tool currently in use to give an account of an argument structure is the argument diagram (FIG. 2). An argument diagram is a set of points or nodes used to represent propositions (i.e., the premises and conclusions of the argument) and a set of lines (i.e., arrows) joining the points together to represent steps of interference. A typical argument diagram gives a map of the overall structure of an extended argument.

Figure 3A:
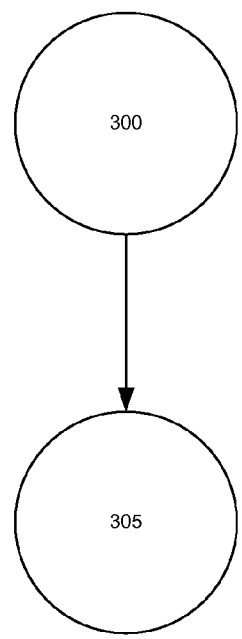
FIG. 3a diagrammatically illustrates a single argument with a single premise and single conclusion FIG. 3b diagrammatically illustrates two premises to support one conclusion.

The process of creating an argument diagram begins by identifying all the components of the argument—namely, its premises and conclusions. Single argument: one premise and one conclusion. FIG. 3a diagrammatically illustrates a single argument with a single premise and single conclusion, represented by the nodes 300 and 305 respectively, with connected by an adjoining arrow.

Figure 3B:
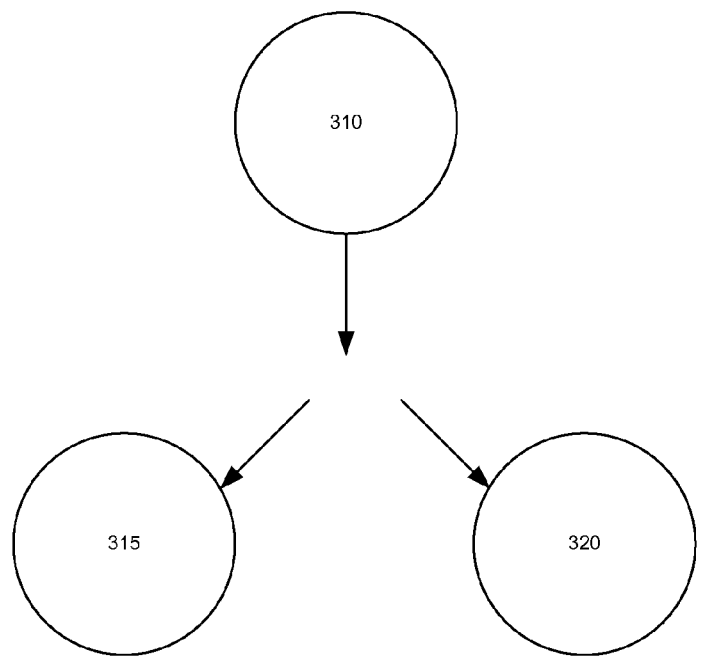
FIG. 3c diagrammatically illustrates the serial argument consisting of three sub-arguments.
FIG. 3d diagrammatically illustrates a convergent argument with a conclusion supported by two premises.
FIG. 3e diagrammatically illustrates a divergent argument with two conclusions supported by a single premise.

A linked argument contains more than one premise and one conclusion. Each premise supports the conclusion through the mediation of the other premise. Both are needed and neither supports the conclusion independently. If taken separately, the premises provide little or no support for the conclusion. But, taken together, they do provide support. FIG. 3b diagrammatically illustrates two premises (nodes 315 and 320) to support one conclusion (node 310).

Figure 3C:
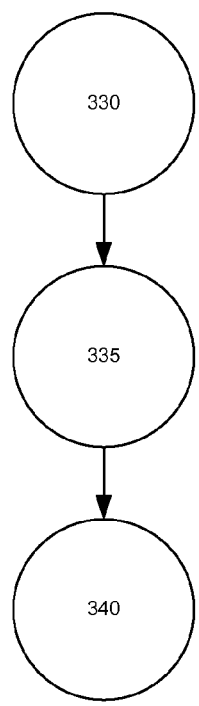

A serial argument is composed of two or more sub-arguments, when the conclusion of the first argument also functions as the premise for the second argument. FIG. 3c diagrammatically illustrates the serial argument consisting of three sub-arguments (nodes 330, 335 and 340).

Figure 3D:
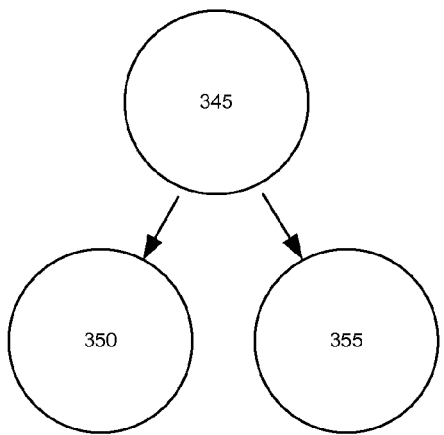

A convergent argument consists of more than one premise. Each premise given an independent reason for accepting the conclusion. FIG. 3d diagrammatically illustrates a convergent argument with a conclusion (node 345) supported by two premises (nodes 350 and 355).

Figure 3E:
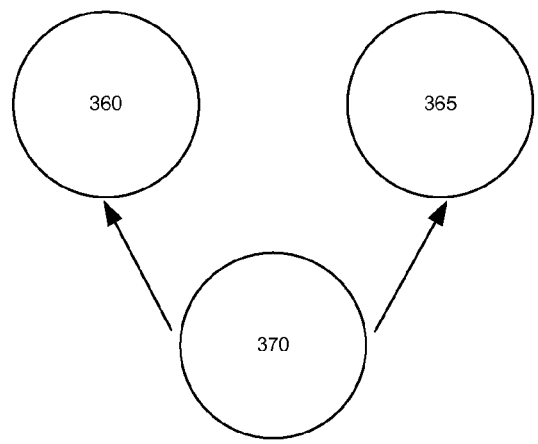

A divergent argument contains more than one conclusion. Each conclusion is supported by a single premise. FIG. 3e diagrammatically illustrates a divergent argument with two conclusions (nodes 360 and 365) supported by a single premise (node 370).

An argument typically takes one of two forms. In the first case, the "claim" is made and the "evidence" to support the claim is presented. In the second instance, the "evidence" is presented before the "claim" is known. Although may other objects and actions may be interpreted in the argument, the general structure follows one of those two forms. A description of both argument forms in the creation of XML tree follows.

Figure 4A:
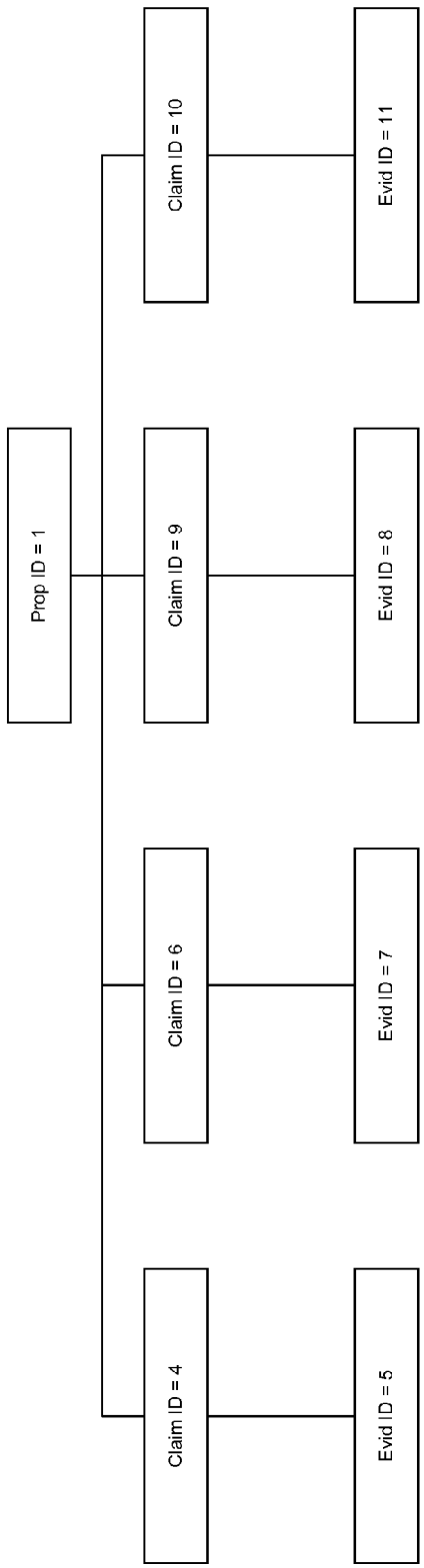
FIG. 4a illustrates a tree structure for a first example book review.
Figure 4B:
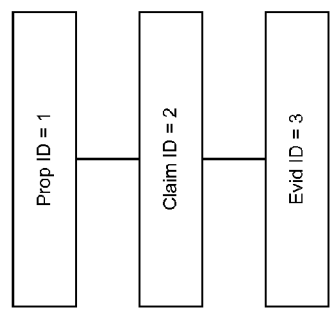
FIG. 4b illustrates a tree structure for a second example book review.
Figure 4C:
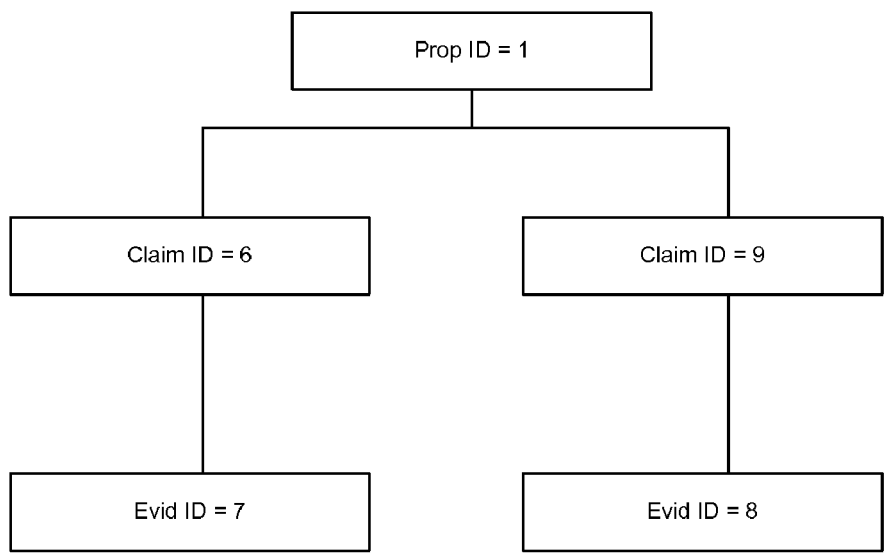
FIG. 4c illustrates a tree structure for a third example book review.

FIG. 4a illustrates a tree structure for a sample document (i.e., a book review or critique) listed below. As shown in FIG. 4a, three of the four claim/evidence pairs (i.e., IDs 4-5, 6-7, 10-11) fall into the argument structure of "claim" followed by "evidence." The remaining claim/evidence pair, (IDs 9/8), falls into the evidence followed by a claim type of argument. The node numbering (serial versus non-serial) shows the claim/evidence sequence. The example of FIG. 4a provides a very balanced tree with four claims and four pieces of evidence to support those claims. This structure is a very typical linked argument structure. FIG. 4b illustrates a tree structure for a second example book review. The second book review structure is a simple serial argument. Much of the text does not support the actual claim given. Instead, it is unrelated material about the authors writing style in relationship to other authors. FIG. 4c illustrates a tree structure for a third example book review. As shown in FIG. 4c, the tree structure is a linked argument structure with two claims and two pieces of evidence to support those claims.

The pseudo-code to create the argumentative document tree structure used for tree structure processing 140 (FIG. 1). Basically, the XML tagged elements are processed individually. The root of the tree is assigned to the "proposition" element. Each successive "claim" is assigned as a child of the "proposition" root. As each "claim" is processed, the remaining XML tagged elements are searched for related argumentative items such "evidence", "observation", "background", etc. For this embodiment, to generate the tree structure, the text is processed twice. The first pass is "pre-ordered" to collect situations where a claim is presented first and other objects (e.g., evidence, etc.) follow. The second pass is "post order", so as to collect situations where evidence and other objects are presented first and the claim follows.

PreOrder Process
        select a claim
        find next evidence
        current evidence is NEW
        current claim is CURRENT
        immediate prior claim is LAST
        NEW as evidence for CURRENT
        NEW as evidence for LAST's ancestors in turn up root
            of tree
    PostOrder Process
        find next evidence
        select a claim
        current claim is CURRENT
        last evidence is TOP
        if TOP is evidence for CURRENT
            pop TOP and make son of CURRENT (build tree
                under CURRENT)
            repeat with new evidence as TOP
        if TOP is not evidence for CURRENT,
            tree with CURRENT as root becomes TOP of stack
            (push CURRENT onto stack)

Text Mark-Up & Encoding

XML is a mark-up language for documents containing structural information. Structured information includes both content, such as words and pictures, and some indication of what role that content plays. For example, content in a section heading has a different meaning from content in a footnote, which means something different than content in a figure caption or content in a database table, etc. A mark-up language is a mechanism to identify structures in a document. The XML specification defines a standard way to add mark up to documents. For a further explanation of XML, see the XML specification, XML (1997), Specification PR-xml-971208, www.w3.org/TR/PR-xml-971208. The XML specification describes a class of data objects called XML documents and partially describes the behavior of computer programs that process those documents.

XML documents are made of storage units called "entities", that contain either parsed or unparsed data. Parsed data are made up of characters, some of which form character data and some of which form markup. Markup encodes a description of the documents storage layout and logical structure. XML provides a mechanism to impose constraints on the storage layout in a logical structure.

As shown in FIG. 1, software modules, entitled text type tagging processing (105) and tree structure processing 140 are used to read XML documents and provide access to their content and structure. In one embodiment, the text type tagging processing (105) and tree structure processing 140 are executing on behalf of a module, labeled host application 170, in FIG. 1. The XML specification also describes compliant behavior of an XML processor, in terms of how it must read XML data and the information it must provide to the application. Elements are the most common form of markup, and they are delimited by angle brackets (<element>). Some elements may be empty, and have no content. If an element is not empty, it begins with a start-tag <element> and ends with an end-tag </element>. Attributes are name-value pairs that occur inside start-tags after the element name. For example <div class="preface"> is a "div" element with the attribute "class" having the value "preface." When used in XML, all attribute values must be quoted.

In order to introduce markup into a document, some characters have been reserved to identify the start of a markup. The left angle bracket, <, for instance, identifies the beginning of an element start or end-tag to insert these characters into a document as content. In XML, entities are used to represent these special characters. Entities are also used to refer to often repeated or varying text and to include the content of external files. Every entity must have a unique name. To use an entity, it is referenced by name. Entity references begin with an ampersand and end with a semicolon. There are three kinds of entities; internal, external, and parameter. Internal entities associate a name with a string of literal text. External entities associate a name with content in another file. Parameter entities solely occur in the document type declaration. A parameter entity declaration is identified by a percent sign in front of its name in the declaration. In a document, a "CDATA" section instructs the parser to ignore most markup characters. The notations used in XML, as described in the XML specification, are well known to those skilled in the art and will not be described further.

A large percentage of the XML specification addresses various sorts of permissible declarations. In one embodiment, the text structure for argumentative discourse is embedded in XML through use of the document type definitions ("DTD"). In general, to provide meaning to a document, so that a style sheet or application can process it, declarations provide constraints on the sequence in nesting of tags. More generally, declarations permit a document to communicate meta-information to the parser about its content. Meta-information includes the allowed sequence and nesting of tags, attribute values and their types and defaults, the names of external files that may be referenced and whether or not they contain XML, the formats of some external (non-XML) data that may be referenced, in the entities that may be encountered.

The DTD for XML represents the structure of the tree or a graph. TEI includes standardized DTD coding for a directed graph, an undirected graph, or a tree. The tree structure is utilized in the present invention for managing the structure of argumentative text. In one embodiment, the following four elements provide the DTD encoding for an XML tree structure. These elements are utilized to represent text and to perform summarization functions. A tree element coding for DTD coding follows.

<!ELEMENT TREE ((LEAF|iNODE*, ROOT, (LEAF|iNODE)*)>
<!ATTLIST TREE
  LABEL CDATA

The above definition indicates that a tree is either made up of one or more leaf elements or iNODE elements followed by a single root element, followed by either one or more leaf elements or iNODE elements. The tree may be named with a LABEL. An example root element definition follows.

<!ELEMENT ROOT EMPTY>
<!ATTLIST ROOT
  ROOTID ID
  LABEL CDATA
  CHILDREN IDREFS

This definition indicates that a root has an ID, a LABEL, and a list of CHILDREN nodes.

The coding for an iNODE element follows.
<!ELEMENT iNODE EMPTY>
<!ATTLIST iNODE
  iNODEID ID
  LABEL CDATA
  PARENT IDREF
  CHILDREN IDREFS This definition indicates that an iNODE has an ID, a LABEL, a list of CHILDREN nodes, and a PARENT node.

Coding for a LEAF element follows.
<!ELEMENT LEAF EMPTY>
<!ATTLIST LEAF
  LEAFID ID
  LABEL CDDATA
  PARENT IDREF The LEAF element definition indicates that a LEAF has an ID, a LABEL, and a PARENT node.

The use of pointers in XML is important to describe tree structures. In one embodiment, two elements are used to generate pointers: ID and IDREF. The ID attribute is used to provide an "identifier" to describe any element used in the argumentative text. The "ID" attribute is defined by the creator of the XML source. An example above, root, leaf, and iNODE elements all contain an identifier described with the ID attribute.

The singular IDREF attribute is used to "point" from one attribute to another. Any attribute given the value IDREF contains a single identifier to point to another element in the XML source. The plural form of IDREF is IDREFS. This definition provides for the capture of more than one pointer. In the example of a ROOT node described above, all of the "children" nodes are listed in the CHILDREN attribute defined as IDREFS.

One embodiment for the DTD for the XML structure necessary to support an argument follows. For this embodiment, the DTD defines each argument clause as an element type for subsequent text tagging. A hierarchical relationship between an "object" and related clauses "proposition, claim, evidence, etc." are supported by DTD. This DTD is supplemented with all of the other standard DTD elements, described above, via the TEI coding standards described more fully below.

```
<!ELEMENT OBJECT
   (PROPOSITION)|
      CLAIM|EVIDENCE|OBSERVATION| BACK-
      GROUND)>
<!ELEMENT ACTION
   ELABORATES|SUPPORTS|CAUSES|EXPLAINS|
      CONFLICT|NEGATES)>
<!ELEMENT PROPOSITION (S|SEG*) EMPTY>
<!ELEMENT CLAIM (S|SEG*) EMPTY>
<!ELEMENT EVIDENCE (S|SEG*) EMPTY>
<!ELEMENT OBSERVATION (S|SEG*) EMPTY>
<!ELEMENT BACKGROUND (S|SEG*) EMPTY>
<!ELEMENT ELABORATES (S|SEG*) EMPTY>
<!ELEMENT SUPPORTS (S|SEG*) EMPTY >
<!ELEMENT CAUSES (S|SEG*) EMPTY>
<!ELEMENT EXPLAINS (S|SEG*) EMPTY>
<!ELEMENT CONFLICTS (S|SEG*) EMPTY>
<!ELEMENT NEGATES (S|SEG*) EMPTY>
```

This DTD coding supports coding of a simple paragraph as illustrated in the following paragraph.

<claim>The ending of this book topped it all off. </claim>
<observation>Perhaps Grisham got tired of "Guy and Girl living happily ever after in the Caymen Islands".</observation><evidence>So in a radical change of events, the last chapter of this book confuses the plot.</evidence>

Figure 5:
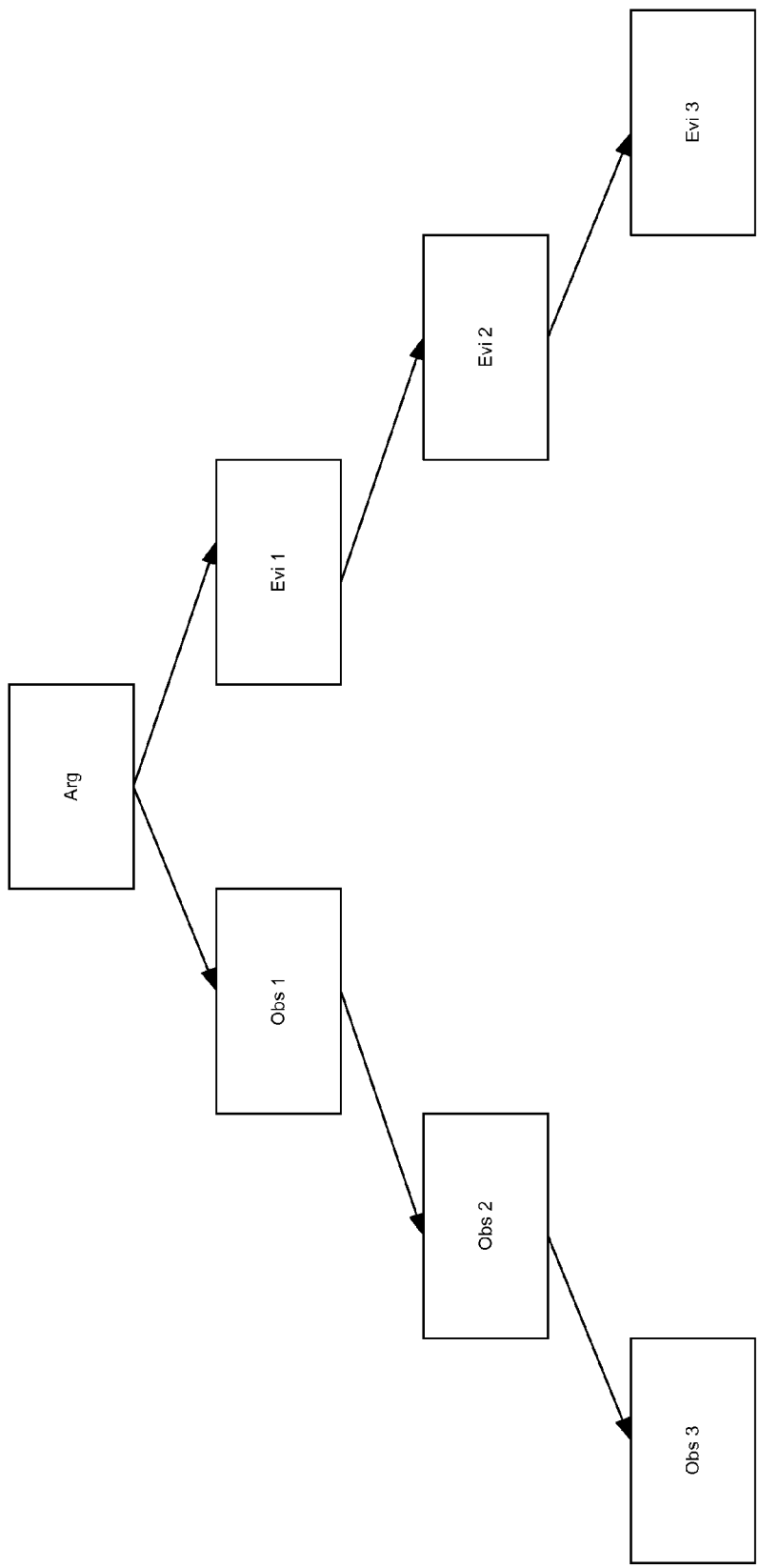
FIG. 5 illustrates one embodiment for implementing the tree structure in XML, by mapping the nested structure generically into the DTD.

FIG. 5 illustrates one embodiment for implementing the tree structure in XML, by mapping the nested structure generically into the DTD. The XML tree of FIG. 5 is utilized for this summarization of text, as is described more fully below. The associated tagged text for the tree of FIG. 5 is listed below.

```
<s ana=arg1>
<s ana=obs1>
<s ana=obs2>
<s ana=obs3>
</s></s></s>
<seg ana=evi1>
   <s></s>
   <s></s>
   <s ana=evi2>
   <s ana=evi3>
   </s></s>
</seg>
</s>
```

This tagging utilizes XML's inherent understanding of trees and nesting based on the tag start and /tag end notation.

TEI Tagging

TEI is the mechanism for attaching analytical notes in some structured vocabulary to text. In one embodiment, the simplest mechanism for attaching analytical nodes in some structured vocabulary to particular text is provided by the TEI <interp> and <interpGrp> elements. The TEI <interp> tag defines the "interpretation" of the associated text. This tag is typically used to define the structure of the text by dividing it into units in a pattern shared with other texts from the same type of discourse or text. Three important <interp> attributes are: type, theme, and discourse type. The type attribute is the name given to the type of interpretation for this portion of text. The theme attribute defines the underlying theme for the associated text. The discourse type attribute defines the type of discourse related to the associated text.

The <interp> tags may be grouped together for a specific portion of text. This grouping is accomplished with the <interpGrp> tag. An example of this group of <interp> tags for the argumentative text-types of the preferred embodiment of the present invention is set forth below.

```
<interpGrp type="argumentative text">
   <interp id="arg" value="argument">
   <interp id="prem" value="premise">
   <interp id="conc" value="conclusion">
   <interp id="evi" value="evidence">
   <interp id="obs" value="observation">
   <interp id="back" value="background">
</interpGrp>
```

Once the text is tagged with the appropriate text types, the tree structure, represented in XML, may be generated. One embodiment for generating the tree structure in XML is depicted in FIG. 5.

The XML DTD coding facilitates the ability to tag a segment of text. A user, or software application, need only be familiar with the different structural choices for an argument. In one embodiment, to standardize the text, the tags are converted from object/action elements to standard "s" (sentence) and "seg" (segment) tags with unique IDs and ANA attributes. The following paragraph illustrates an encoded TEI text utilizing the argumentative text-types.

<s ID=1 ANA=claim>The ending of this book topped it all off. <is> <s ID=2 ANA=observation>Perhaps Grisham got tired of "Guy and Girl living happily ever after in the Caymen Islands". </s> <sID=3 ANA=evidence>So in a radical change of events, the last chapter of this book confuses the plot.</s>

This process embodiment minimizes the "user" knowledge required to implement this technique. It also reduces the need for the user to understand the technical aspects of the approach. For example, generation of unique identifiers for each piece of tagged text need not be known by the user.

EXAMPLE OF STRUCTURED TEXT SUMMARIZATION

The following three documents, which are book reviews, are used to illustrate the summarization process of the present invention.

Book Review 1

<s id=1 ana=proposition>The Partner was another case of a decent plot, taken from the wrong angle.</s> First, here is a basic plot summary.

<seg id=2 ana=background>The book started as chapter one talking about a man named Patrick Lanigan who took 90 million dollars from his law firm. Then he proceeded to fake his own death and took off running. After four years in Brazil (where he was hiding), he was caught by American bounty hunters. Patrick was later turned over to the FBI. This is all basically summed up or acted about in the first 30 pages</seg>.

Unfortunately, this book should have been about that. Instead, it picks up *after* all this happened and how the audience (—hurray!—) get to listen to Patrick reveal his story slowly over the next redundant 400 odd pages. We would describe the plot, but this is being written two weeks after it was read. Unfortunately, this book was so bad we forgot all that happened.

Another thing about this book was the lead character, <s id=3 ana=background>Rudy Baylor of The Rainmaker was a great character.<s id32 4 ana=claim>Patrick Lanigan, however was the most un-likable character of all his books. </s><s id=5 ana=evidence>You can not seem to find a reason to relate with him</s>.

<s id=6 ana=claim>The ending of this book topped it all off</s>.Perhaps Grisham got tired of "Guy and Girl living happily ever after in the Caymen Islands".<s id=7 ana=evidence>So in a radical change of events, the last chapter of this book confuses the plot.</s>

<s id=8 ana=evidence>Basically, the trouble with The Partner was that the majority of the story was about a man sitting down telling HIS story. .</s> <s id=9 ana=claim>The book should have ended where it started off. .</s> <s id=10 ana=claim>Another problem with this book was the cynicism. .</s>Let's fact it, John Grisham has got to be the most cynical person when it comes to Lawyers and the Justice System. In most books (Rainmaker, A Time to Kill, just to name a few), the cynicism works. Why? Because the plot works with it and allows the reader to feel the same way.<s id=11 ana=evidence>However, due to the stagnate plot and weak characters, it did not work in this book..</s>

Better luck next time John!

The following encoded text is a result of the first book review.
```
<TREE ((4,6),1,(9,10))LABEL="Book Review One">
<ROOT ROOTID=1, LABEL="The Partner was another
    case of a decent plot taken from the wrong angle",CHIL-
    DREN=(4,6,9,10)>
<iNODE iNODEID=4, LABEL="Patrick Lanigan, how-
    ever, was the most unlikable character of all his books",
    PARENT=1, CHILDREN=(5)>
<LEAF LEAFNODE=5, LABEL="You can not seem to
    find a reason to relate with him",PARENT=4>
<NODE iNODEID=6, label="The ending of this book
    topped it all off."PARENT=1, CHILDREN=(7)>
<LEAF LEAFNODE=7, LABEL="So in a radical change
    of events, the last chapter confuses the plot.", PAR-
    ENT=6>
<NODE iNODEID=10, LABEL="Another problem with
    this book was the cynicism.",
    PARENT=1, CHILDREN=(11)>
<LEAF LEAFNODE=11, LABEL="However, due to the
    stagnate plot and weak characters, it did not work in this
    book.", PARENT=10>
<iNODE iNODEID=9, LABEL=>The book should have
    ended where it started off",
    PARENT=1, CHILDREN=(8)>
<LEAF LEAFNODE=8, LABEL="Basically, the trouble
    with The Partner was that the majority of the story was
    about a man sitting down telling HIS story.",
    PARENT=9>
```
This tree is embedded in the argumentative text file for summarization processing. The argument tree for the first book review is shown in FIG. 4a.

Review Two (From Eds book 1999—Web Address www.edsbook.com)

<s id=1 ana=proposition> Grisham has changed over the years from a lawyer who is trying out writing to a trying writer who used to be a lawyer. </s>

<seg id=2ana=claim>Since Chamber, Grisham tries more serious issues and more reasonable endings. However, he hasn't completely outgrown sensational endings on which his fame is based.</seg> <seg id=3 ana=evidence>Therefore, for the serious side of reading, no structural building toward the inevitable ending is presented, while, for the fun side of reading, no catarsis of 3-point basket with the sound of buzz is provided. Meaning, it's half-baked cookies.</seg>

The Partner is on the same line of mistakes. Of course he is progressing. This is much better than Chamber of Rainmaker, which I believe, went to straight to chop shop in Hollywood. I just don't wan to pay for an-apprentice-to-be-a-writer's practice writing. I strongly suggest to Grisham that, either go back to sensational writing he does so well, or start some serious training before publishing any more books. Much better, decide first if he wants to make money or to write a book, If you want to read this book, OK. It's actually not as bad as I sounded. I'd wait and buy a paperback and expect a few hours of fun, not literary but commercially. It deserves that much, say less than $10.

Review Three (also from Eds book 1999. Web address www.edsbook.com)

<s id=1 ana=proposition>Although critics have panned John Grisham's latest thriller, he's sure to make another bundle with The Partner, </s> the story of a man who fakes his death and steals $90 million. He's discovered years later in Brazil with a new look, a modest lifestyle and friends who know nothing of his past.

<seg id=2 ana=background>The story begins when Danilo Silva is found and tortured by thugs who want to know where he hid the money. When he was Patrick Lanigan, before his death, he had a lawyer friend, Sandy McDermott, upon whom he now calls to represent his legal interests</seg>

John Grisham has created a set of circumstances and characters worthy of praise, not criticism. A lawyer himself, he obviously knows the legal system well, although a non-lawyer can't know for sure whether any of Patrick's ploys would work in real life.

But The Partner isn't a documentary. <s id-3 ana=evidence>It's a novel, complete with love, betrayal and dirty secrets, which could happen in life and probably do.</s><seg id=4 ana=claim>As a writer, Grisham knows his craft well; most of his characters are flesh and blood, not cardboard. The plot zings, which could keep the reader up nights aching to find out what happens next.</seg>

<s id=5 ana=claim>If there is a flaw in The Partner it's that there are too many characters to know well.<is><s id=6 ana=evidence>The plot moves so swiftly it's difficult to keep the names straight </s>No matter. Their names become less important than the next legal maneuver.

A word of warning: although there's little graphic violent and almost no sex, the reader will find himself hurting a little where Patrick was injured during the torture scenes. That's the might imagery conjured up by a master writer.

And that's the most satisfying of all. Grisham could give lessons to Stephen King on maintaining read interest but avoiding the gore that turns some off.

SUMMARY GENERATION

Once the DTD is defined for the associated text fragments, the fragments are combined into a simple pre-order tree structure. Once the text tree has been created, there are many embodiments for implementing summarization. For example, in one embodiment, XML provides options for selecting specific tags and/or using the DTD to define the important tags. For example, using DTD, all arguments for a particular piece of text may be extracted. In combination with HTML style sheets, also called XSL, the arguments from text may be highlighted and formatted in a variety of ways. In another embodiment, only those tags designated as "important" are presented as summarization options for the user. For example, the text summary may provide the argument and all the underlying evidence. For this embodiment, multiple argument trees are combined to provide one summary of multiple text files. For example, all of the arguments/evidence trees may be summarized and displayed via HTML style sheets to provide a "pro/con" analysis of the underlying text.

The text structure techniques of the present invention provide a completely flexible approach to text summarization. The technique is completely domain independent and it utilizes style mechanisms for cohesion and coherence. In addition, it provides for phrase, sentence, and/or full passage summaries.

In the preferred embodiment, multiple document summarization is performed from the tagged text, tagged via the TEI standard, and an argument tree structure represented by XML elements. The summarization process does not focus on selecting the best sentences to include a single summary. Instead, the user of the summarization process is provided with different portions of related argument trees. The user decides which argumentative components are interesting to that user. For example, a user may be interested in all of the "evidence" used to make claims about a particular item of interest.

Figure 6A:
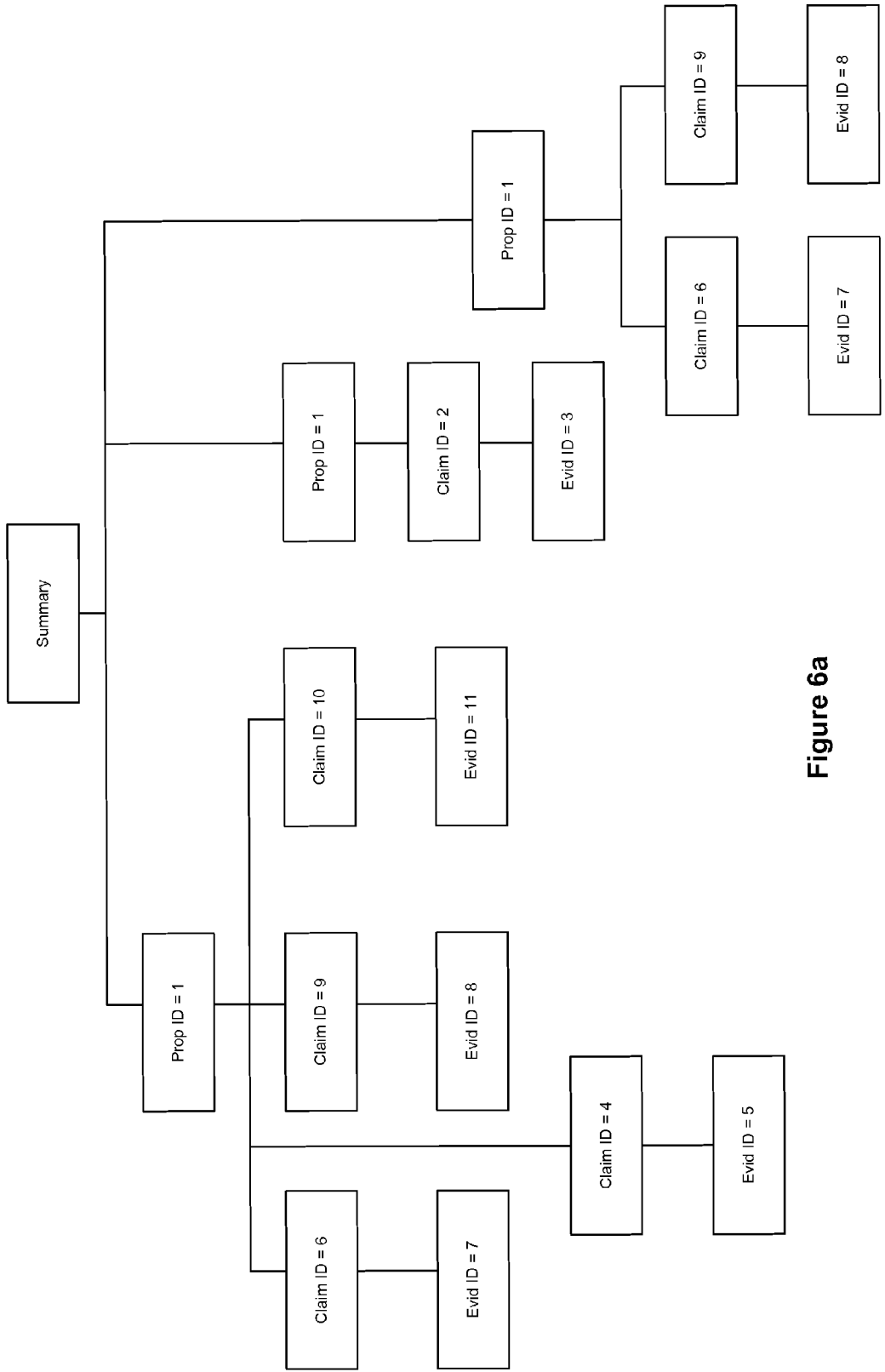
FIG. 6a represents, as an argument tree, a combination of three example book reviews.
Figure 6B:
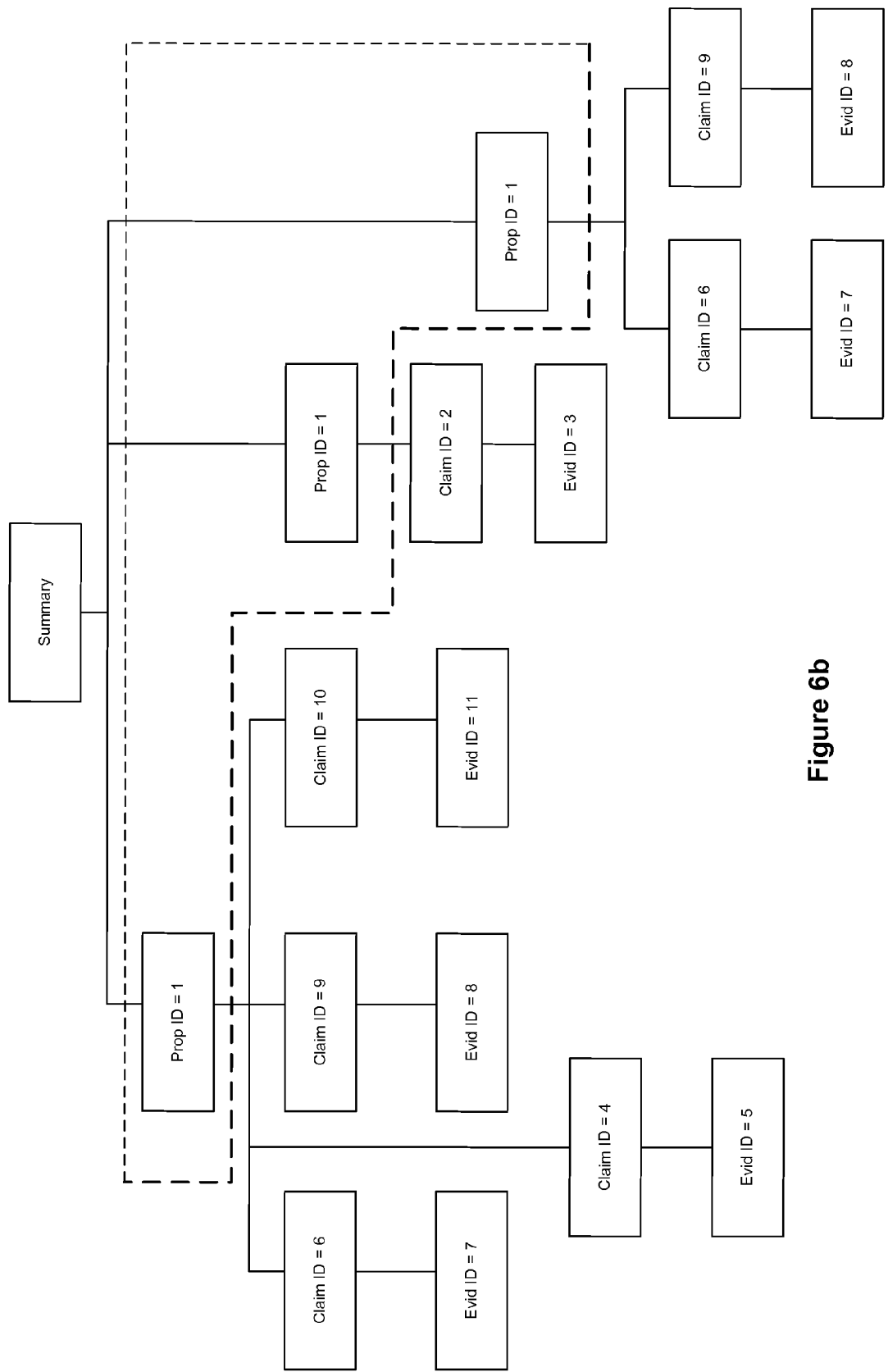
FIG. 6b illustrates selecting the "propositions", through highlighting the three propositions with the dashed line.

In one embodiment, a multiple document summarization is based on a two step approach. The first step defines a new root for each separately defined text tree. Each of the text trees, which are combined, present an argument related to the same item. FIG. 6a represents, as an argument tree, the combined three book reviews discussed above. After combining the three book reviews, based on the same item (i.e., the item is the review of the same book), the second step is to select portions of the tree for summarization. For example, the user of the summarization system may request all of the "propositions" set forth in the combined argument tree. FIG. 6b illustrates selecting the "propositions", through highlighting the three propositions with the dashed line. From this request, the summarization processing 150 (FIG. 1) extracts, from the documents 130, the following portions.

<ROOT ROOTID=1,
LABEL=
"The Partner was another case of a decent plot, taken from the wrong angle.",
CHILDREN=(4,6,9,10)>
ROOT ROOTID=1
LABEL=
"Grisham has changed over the years from a lawyer who is trying out writing to a trying writer who used to be a lawyer.",
CHILDREN=(2)>
<ROOT ROOTID=1
LABEL=
"Although critics have panned John Grisham's latest thriller, he's sure to make another bundle with The Partner.",
CHILDREN=(6,9)>"

Figure 6C:
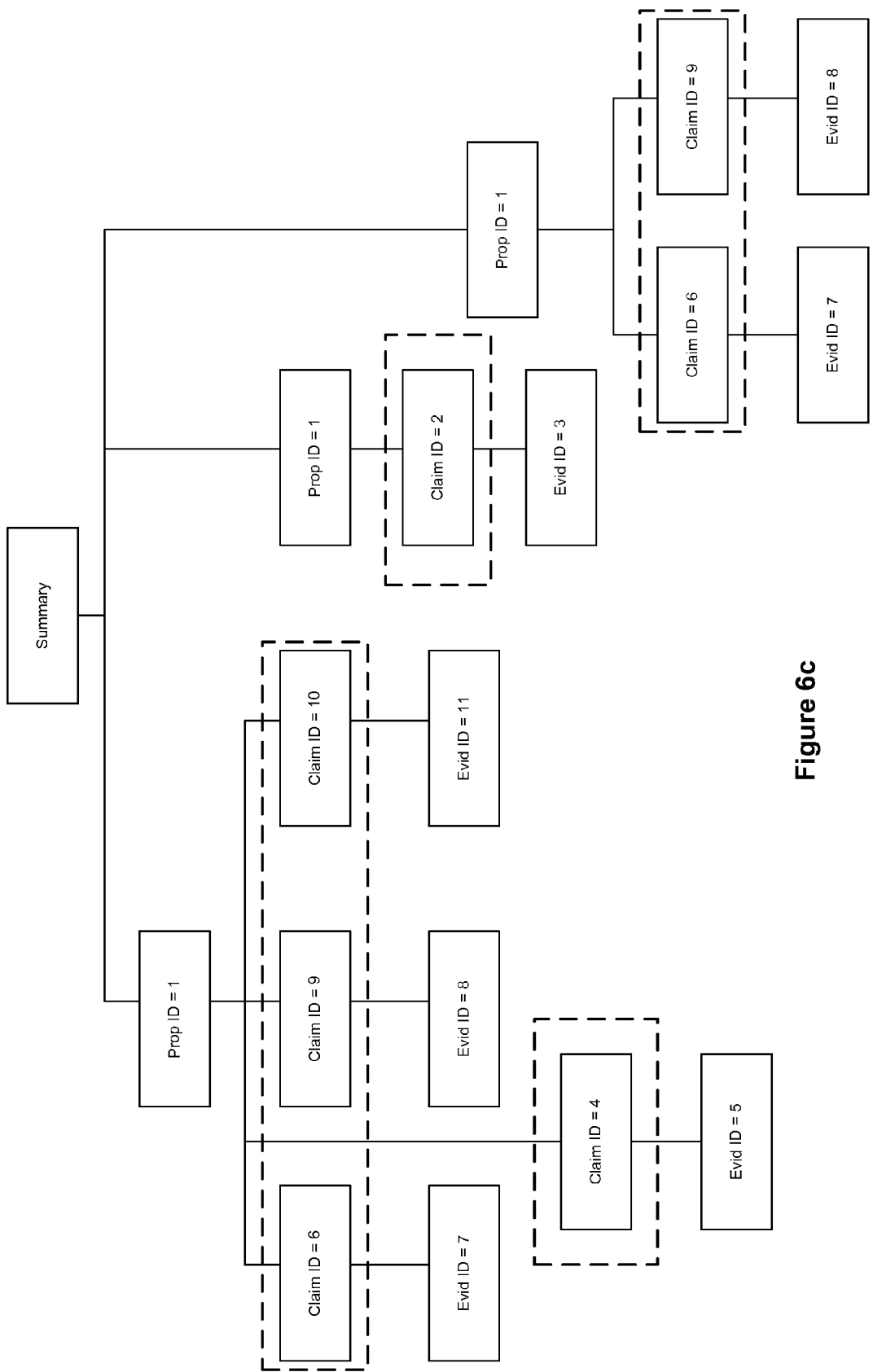
FIG. 6c illustrates, through the dashed lines, the extraction of claims with the propositions of the three book reviews.

Using one or more of the argument trees, the user may "walk" the tree in many different directions. For example, the user could request extraction of the "claims", to support the proposition extracted in the example of FIG. 6b. FIG. 6c illustrates, through the dashed lines, the extraction of claims with the propositions of the three book reviews. The user may explore a particular proposition to consider the claims and evidence for that proposition. Also, the user may look at the evidence for each of those claims. This approach provides maximum flexibility to the user, by permitting the user to select any combination of text types. In one embodiment, the summarization processing 150 provides, in a comprehensive user interface, all the different combinations. The argumentative tree structure provides the user with the maximum amount of flexibility required.

In one embodiment, the implementation of this methodology includes directs hyperlinks, summary hyperlinks, and hierarchy-based and text-based searching. Thus, the system provides the user with a visual hierarchy for selection and easy tools for zooming into various details. As shown in the book review example discussed, a selector tool may be used to select all nodes at a common level. In addition, a user interface would permit the user to "drill down" and "drill up" to walk through the tree hierarchy. Common requests, such as reviewing all propositions or all claims in evidence, may be provided as a specific function in the application.

The text summarization approach of the present invention may be embedded in XML capable browsers, into information retrieval systems, and into information extraction systems to manager different classes of objects, different parts of documents, and different types of information contained in a document, as shown by the host application 170 in FIG. 1. In addition, this approach enables more useful navigational models in web browsers. Currently, web browsers have either primitive navigational capabilities because they know so little about the information they browse. The browsing model is one where the current document has a number of links into portions of the document. The user may choose a link out of the current document or move backwards or forwards in the list of "already seen" documents, with built-in text structure and summarization knowledge, the browser has information about documents available because it can distinguish among contextual portions of a document. A web site offering a collection of arguments marked up this way will create entirely new possibilities unavailable with arguments stored directly in HTML or simple text documents.

COMPUTER SYSTEM

Figure 7:
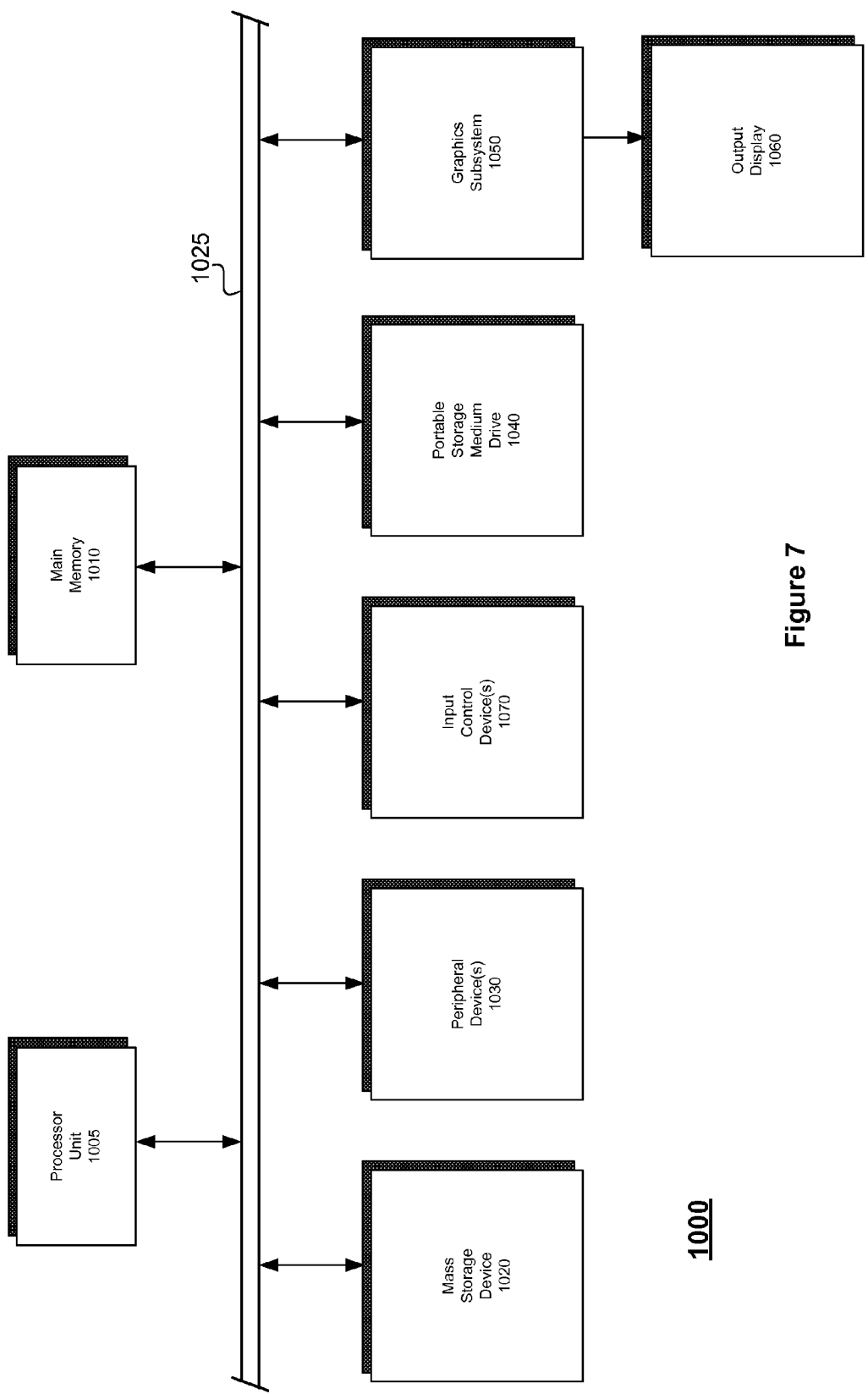
FIG. 7 illustrates a high level block diagram of a general purpose computer or in which the summarization system of the present invention may be implemented.

FIG. 7 illustrates a high level block diagram of a general purpose computer, in which the summarization system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. The main memory 1010 stores the executable code for the summarization system when in operation. The main memory 1010 may include banks of dynamic random access memory (DRAM) as well as high speed cache memory.

The compute system 1000 further includes a mass storage device 1020, peripheral device(s) 1030, portable storage medium drive(s) 1040, input control device(s) 1070, a graphics subsystem 1050, and an output display 1060. For purposes of simplicity, all components except 1060 in the computer system 1000 are shown in FIG. 7 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, and graphics subsystem 1050 may be connected via one or more input/output (I/O) busses. The mass storage device 1020, which may be implemented with a magnetic disk drive or an optical disk drive, is a non-volatile storage device for storage data and instructions for use by the processor unit 1005. In the software embodiment, the mass storage device 1020 stores the summarization system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the summarization system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. The summarization system may be input to the computer system 1000 via a portable storage medium or a network for processing by the computer system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, a stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The summarization system may be implemented in either hardware or software. For the software implementation, the summarization system is software that includes a plurality of computer executable instructions for implementation on a general purpose computer system. Prior to loading into a general purpose computer system, the summarization system software may reside as encoded information on a computer readable medium, such as a magnetic floppy disk, magnetic tape, and compact disc read only memory (CD-ROM). In one hardware implementation, the summarization system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A computer readable medium comprising a plurality of instructions stored thereon when executed, generate summaries for a plurality of documents comprising text, the computer readable medium comprising sets of instructions for:
    a) for each document in the plurality of documents, generating text structure tags for the document including generating text structure tags in accordance with Text Encoding Initiative (TEI), the text structure tags identifying a plurality of argumentative text types, wherein a text type comprises a type of argumentative content for an associated portion of a document, the types of argumentative content comprising an argument premise giving support, evidence, or reasoning for or against a conclusion or the conclusion comprising a resulting determination made using one or more argument premises;
    b) for each document in the plurality of documents, encoding the document to generate a tree structure comprising a plurality of nodes, wherein the nodes correspond with the text types and hierarchical relationships among the nodes reflect argumentative relationships among the text types, and wherein encoding the document comprises mapping a base hierarchical structure, utilizing DTD of the eXtensible Markup Language ("XML"), to reflect said hierarchical relationships; and processing the document to generate the tree structure in accordance with the base hierarchical structure;
    c) selecting a plurality of tree structures for the plurality of documents;
    d) combining, as a single logical tree structure, the plurality of tree structures; and
    e) generating a summary for the plurality of documents by:
        i) receiving from a user a selection of one or more particular text types for summarization, the one or more particular text types comprising the argument premise text type; and
        ii) identifying, based upon the text type tags, a set of nodes from the plurality of tree structures corresponding to the one or more selected text types including one or more nodes corresponding to the argument premise text type; and
        iii) extracting portions of text from the plurality of documents that correspond to the identified set of nodes selected to form the summary of the plurality of documents.

2. The computer readable medium as set forth in claim 1, further comprising sets of instructions for:
    providing a visual hierarchy of the single logical tree structure;
    providing a user interface for receiving user selection of one or more particular nodes of the single logical tree structure; and
    extracting portions of text from the plurality of documents that correspond to said one or more selected nodes.

3. A computer system for generating summaries for a plurality of documents comprising text, said computer system comprising:
    memory for storing the plurality of documents; and
    a processing unit, coupled to said memory, configured for:
        a) for each document in the plurality of documents, generating text structure tags for the document including generating text structure tags in accordance with Text Encoding Initiative (TEI), the text structure tags identifying a plurality of argumentative text types, wherein a text type comprises a type of argumentative content for an associated portion of a document, the types of argumentative content comprising an argument premise giving support, evidence, or reasoning for or against a conclusion or the conclusion comprising a resulting determination made using one or more argument premises;

b) for each document in the plurality of documents, encoding the document to generate a tree structure comprising a plurality of nodes, wherein the nodes correspond with the text types and hierarchical relationships among the nodes reflect argumentative relationships among the text types, and wherein encoding the document comprises mapping a base hierarchical structure, utilizing DTD of the eXtensible Markup Language ("XML"), to reflect said hierarchical relationships; and processing the document to generate the tree structure in accordance with the base hierarchical structure;

c) selecting a plurality of tree structures for the plurality of documents;

d) combining, as a single logical tree structure, the plurality of tree structures; and e) generating a summary for the plurality of documents by:
  i) receiving from a user a selection of one or more particular text types for summarization, the one or more particular text types comprising the argument premise text type; and
  ii) identifying, based upon the text type tags, a set of nodes from the plurality of tree structures corresponding to the one or more selected text types including one or more nodes corresponding to the argument premise text type; and
  iii) extracting portions of text from the plurality of documents that correspond to the identified set of nodes selected to form the summary of the plurality of documents.

4. The computer system as set forth in claim 3, wherein said processor unit is further configured for:

providing a visual hierarchy of the single logical tree structure;

providing a user interface for receiving user selection of one or more particular nodes of the single logical tree structure; and extracting portions of text from the plurality of documents that correspond to said one or more selected nodes.

5. A computer-implemented method for generating summaries for a plurality of documents comprising text, the method comprising:

a) for each document in the plurality of documents, generating text structure tags for the document including generating text structure tags in accordance with Text Encoding Initiative (TEI), the text structure tags identifying a plurality of argumentative text types, wherein a text type comprises a type of argumentative content for an associated portion of a document, the types of argumentative content comprising an argument premise giving support, evidence, or reasoning for or against a conclusion or the conclusion comprising a resulting determination made using one or more argument premises;

b) for each document in the plurality of documents, encoding the document to generate a tree structure comprising a plurality of nodes, wherein the nodes correspond with the text types and hierarchical relationships among the nodes reflect argumentative relationships among the text types, and wherein encoding the document comprises mapping a base hierarchical structure, utilizing DTD of the eXtensible Markup Language ("XML"), to reflect said hierarchical relationships; and processing the document to generate the tree structure in accordance with the base hierarchical structure;

c) selecting a plurality of tree structures for the plurality of documents;

d) combing, as a single logical tree structure, the plurality of tree structures; and e) generating a summary for the plurality of documents by:
  i) receiving from a user a selection of one or more particular text types for summarization, the one or more particular text types comprising the argument premise text type; and
  ii) identifying, based upon the text type tags, a set of nodes from the plurality of tree structures corresponding to the one or more selected text types including one or more nodes corresponding to the argument premise text type; and
  iii) extracting portions of text from the plurality of documents that correspond to the identified set of nodes selected to form the summary of the plurality of documents.

6. The method as set forth in claim 5, wherein:

receiving a selection of one or more particular text types for summarization comprises receiving a selection for said argument premise text type for summarization; and extracting portions of text from the plurality of documents comprises extracting portions of text from the plurality of documents that correspond to nodes corresponding to said argument premise text type.

7. The method as set forth in claim 5, wherein:

receiving a selection of one or more particular text types for summarization comprises receiving a selection for said conclusion text type for summarization; and extracting portions of text from the plurality of documents comprises extracting portions of text from the plurality of documents that correspond to nodes corresponding to said conclusion text type.

8. The method as set forth in claim 5, wherein:

receiving a selection of one or more particular text types for summarization comprises receiving a selection for said argument premise and conclusion text types for summarization; and extracting portions of text from the plurality of documents comprises extracting portions of text from the plurality of documents that correspond to nodes corresponding to said argument premise and conclusion text types.

9. The method as set forth in claim 5, further comprising:

providing a visual hierarchy of the single logical tree structure;

providing a user interface for receiving user selection of one or more particular nodes of the single logical tree structure; and extracting portions of text from the plurality of documents that correspond to said one or more selected nodes.

* * * * *

UNITED STATES PATENT AND TRADEMARK OFFICE
CERTIFICATE OF CORRECTION

| | |
|---|---|
| PATENT NO. | : 7,509,572 B1 |
| APPLICATION NO. | : 09/356105 |
| DATED | : March 24, 2009 |
| INVENTOR(S) | : Melander et al. |

It is certified that error appears in the above-identified patent and that said Letters Patent is hereby corrected as shown below:

On page 2, under "U.S. Patents Documents", in column 1, line 13, after "Ueda" insert -- 704/9 --.

In column 1, line 14, delete "of" and insert -- or --, therefor.

In column 2, line 47, after "conclusion" insert -- . --.

In column 3, line 41, delete "structure" and insert -- structures --, therefor.

In column 3, line 65, delete "information" and insert -- informational --, therefor.

In column 4, line 16, delete "above." and insert -- below. --, therefor.

In column 4, line 52, delete "action" and insert -- actions --, therefor.

In column 5, line 9, before "these" delete "the".

In column 5, line 26, delete "interference." and insert -- inference. --, therefor.

In column 5, line 34, before "connected" delete "with".

In column 5, line 51, delete "given" and insert -- gives --, therefor.

In column 5, line 63, delete "may" and insert -- many --, therefor.

In column 5, line 64, delete "interpreted" and insert -- interspersed --, therefor.

In column 10, line 49, delete "as" and insert -- at --, therefor.

In column 11, line 57, delete "Eds book 1999—Web" and insert -- Edsbook 1999. Web --, therefor.

In column 12, line 9, delete "wan" and insert -- want --, therefor.

Signed and Sealed this

Twenty-fifth Day of May, 2010

David J. Kappos
*Director of the United States Patent and Trademark Office*

In column 12, line 21, delete "Eds book" and insert -- Edsbook --, therefor.

In column 13, line 26, before "a" insert -- in --.

In column 13, line 33, before "multiple" delete "a".

In column 14, line 1, delete "proposition" and insert -- propositions --, therefor.

In column 14, line 25, delete "in" and insert -- into --, therefor.

In column 14, line 27, delete "manager" and insert -- manage --, therefor.

In column 14, line 48, delete "computer," and insert -- computer --, therefor.

In column 14, line 60, delete "compute" and insert -- computer --, therefor.

In column 15, line 8, delete "storage" and insert -- storing --, therefor.

In column 18, line 11, in Claim 5, delete "combing" and insert -- combining --, therefor.